United States Patent
Banholzer et al.

(10) Patent No.: US 7,866,214 B2
(45) Date of Patent: Jan. 11, 2011

(54) PRESSURE GAUGE WITH HYDRAULIC PRESSURE TRANSMISSION

(75) Inventors: Karl-Heinz Banholzer, Aachen (DE); Thomas Uehlin, Schopfheim (DE); Jürgen Lange, Vellmar (DE); Olaf Textor, Lörrach (DE); Raimund Becher, Ehrenkirchen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 333 days.

(21) Appl. No.: 11/666,209

(22) PCT Filed: Oct. 24, 2005

(86) PCT No.: PCT/EP2005/055492

§ 371 (c)(1),
(2), (4) Date: Oct. 29, 2008

(87) PCT Pub. No.: WO2006/045771

PCT Pub. Date: May 4, 2006

(65) Prior Publication Data

US 2009/0107245 A1 Apr. 30, 2009

(30) Foreign Application Priority Data

Oct. 29, 2004 (DE) .................. 10 2004 052 950

(51) Int. Cl.
*G01L 7/00* (2006.01)
(52) U.S. Cl. .............................................. 73/714
(58) Field of Classification Search .................. None
See application file for complete search history.

(56) References Cited

U.S. PATENT DOCUMENTS

| 4,722,228 | A | 2/1988 | Awa |
| 6,935,179 | B2* | 8/2005 | Banholzer et al. ............. 73/712 |
| 7,152,477 | B2* | 12/2006 | Banholzer et al. ............. 73/700 |
| 7,497,127 | B2* | 3/2009 | Burczyk et al. ............... 73/716 |
| 7,509,865 | B2* | 3/2009 | Burczyk et al. ............... 73/715 |
| 2007/0289386 | A1* | 12/2007 | Burczyk et al. ............... 73/717 |
| 2008/0127738 | A1* | 6/2008 | Burczyk et al. ............... 73/716 |

FOREIGN PATENT DOCUMENTS

DE 688 097 2/1940
DE 1 948 191 1/1971

(Continued)

*Primary Examiner*—Andre J Allen
(74) *Attorney, Agent, or Firm*—Bacon & Thomas, PLLC

(57) ABSTRACT

A pressure gauge, or transducer, for high-temperature applications, comprising a sensor module with a sensor body having a measuring cell chamber containing a pressure measuring cell. The pressure measuring cell can be subjected to the action of a pressure via a first hydraulic path filled with a transmission liquid. The pressure gauge also comprises a transmission module for transmitting a pressure to the first hydraulic path. The transmission module has a second hydraulic path, which is filled with a transmission liquid and extends from a process diaphragm, through a transmission body and to a transmission diaphragm. The transmission diaphragm is attached to the transmission body in a pressure-tight manner, and the sensor body is joined to the transmission body in a pressure-tight manner, whereby the transmission diaphragm communicates with the first hydraulic path so that the pressure of the second hydraulic path can be transmitted via the transmission diaphragm to the first hydraulic path.

13 Claims, 2 Drawing Sheets

FOREIGN PATENT DOCUMENTS

| | | |
|---|---|---|
| DE | 25 23 869 | 12/1976 |
| DE | 100 52 079 A1 | 5/2002 |
| DE | 101 50 691 A1 | 4/2003 |
| DE | 102 00 779 A1 | 7/2003 |
| JP | 59-68636 | 4/1984 |
| WO | WO 96/27124 | 9/1996 |
| WO | WO 02/33373 A1 | 4/2002 |

* cited by examiner

PRESSURE GAUGE WITH HYDRAULIC PRESSURE TRANSMISSION

TECHNICAL FIELD

The present invention relates to a pressure gauge, or transducer, with hydraulic pressure transmission, or transfer, especially one for use at high temperatures.

BACKGROUND DISCUSSION

Pressure transducers with hydraulic pressure transmission include usually a hydraulic path extending between a process diaphragm, or membrane, and a pressure measuring cell, with the process diaphragm being exposed to a process medium, whose pressure is to be ascertained. Problematic are, in such case, situations, in which high temperatures of the process medium occur at a low process pressure, for example temperatures over 200° C. at a pressure below 100 mbar. Under these conditions, the transmission liquid in the hydraulic path can evaporate, or outgas, as the case may be. This can, in the most favorable case, occur reversibly according to the vapor pressure curve for the particular transmission liquid, with, however, in such case, plastic deformation of the process diaphragm being possible, which can lead to an erroneous measurement. Frequently, the transfer liquid behaves, however, not according to the vapor pressure curve for the pure state, for, due to reactions with impurities or with the surfaces bounding the hydraulic path, the transmission liquid can contain volatile decomposition products, which, following outgassing, no longer go back into solution.

As a result, it is advantageous to utilize transmission liquids which are as temperature stable as possible and have a sufficiently low vapor pressure. Additionally, the transmission liquid should be charged into the hydraulic path in such a way that it remains chemically stable. This is, however, often opposed by other boundary conditions. For example, electronic components and a semiconductor measuring cell cannot be subjected to the high temperatures advantageous for charging. For the charging temperature should, in the ideal case, not lie beneath the maximum process temperature, and hydraulic transmission systems are utilized precisely because of the desire to protect the electronic components and measuring cell from the high process temperatures.

SUMMARY OF THE INVENTION

It is, therefore, an object of the present invention to provide a pressure transducer overcoming the disadvantages of the prior art. The object is achieved according to the invention by the pressure transducer as defined in the independent patent claim 1.

A pressure transducer of the invention includes:

A sensor module having a sensor body, which includes a measuring cell chamber, in which a pressure measuring cell is arranged, with the pressure measuring cell being loadable via a first hydraulic path filled with a transmission liquid; and a transmission module for transmitting a pressure to the first hydraulic path; wherein the transmission module includes, filled with a transmission liquid, a second hydraulic path, which extends from a process diaphragm through a transmission body to a transmission diaphragm, the transmission diaphragm is secured pressure-tightly to the transmission body, and the sensor body is connected pressure-tightly with the transmission body in such a manner that the first hydraulic path communicates with the transmission diaphragm, so that the pressure of the second hydraulic path is transmittable through the transmission diaphragm to the first hydraulic path.

In an embodiment of the invention, the transmission diaphragm is secured on an end surface of the transmission body to form a transmission pressure chamber and the process diaphragm is secured to a surface of a process body to form a process pressure chamber, with the second hydraulic path extending between the process pressure chamber and the transmission pressure chamber, for example through a capillary line. The process body can be embodied as one piece with the transmission body, or it can be separate therefrom. From the point of view of effective thermal decoupling, a separately embodied process body is currently preferred.

In a further development of the invention, the process pressure chamber is formed in the end surface of a process body, with the process body being spaced from the transmission body. The second hydraulic path includes a pressure line, especially a capillary line, which extends between the process body and the transmission body. In a further development of the invention, the surfaces bounding the second hydraulic path involve a material or materials, which is/are chemically stable with respect to the transmission liquid in the second hydraulic path and also exert no catalytic effect for reactions of the transmission liquid. The materials include, for example, corrosion resistant alloys, especially stainless steels. The surfaces bounding the second hydraulic path include, preferably, molybdenum-containing stainless steels, which, except for possibly present impurities, have no titanium.

In a further development of the invention, the second hydraulic path is charged with transmission liquid at a fill pressure PA and a fill temperature TA, with the fill temperature lying not more than 10 kelvin below, preferably at least at and especially preferably at least 10 kelvin above the specified maximum temperature of the process medium for the operation of the pressure transducer. The fill pressure PA can be, for example, not more than 200 mbar, preferably not more than 100 mbar, further preferably not more than 50 mbar and especially preferably not more than 25 mbar.

Suitable fill temperatures TA amount to, for example, not less than 200° C., preferably not less than 240° C., further preferably not less than 280° C. and especially preferably not less than 290° C.

In a further development of the invention, the transmission module includes a temperature sensor, which preferably is arranged neighboring the process pressure-chamber, respectively the process diaphragm, in order to measure a temperature value providing information concerning the temperature of the transmission liquid in the process pressure chamber.

According to another point of view of the invention, the sensor body is connected pressure tightly with the transmission body, with the first hydraulic path comprising the volume enclosed between the sensor body, the transmission diaphragm and the transmission body. The sensor body is connected pressure tightly with the transmission body along first and second assembly surfaces, preferably by welding. The charging of the first hydraulic path with a transmission liquid occurs preferably after the connecting of the sensor body with the transmission body.

The transmission liquid in the first hydraulic path can be different from that in the second hydraulic path, since it is not subjected to the high temperatures experienced by the transmission liquid in the process pressure chamber. Additionally, the charging of the first hydraulic path can occur at more moderate temperatures.

BRIEF DESCRIPTION OF THE DRAWINGS

Further advantages and points of view will become apparent from the dependent claims as well as the description of an example of an embodiment presented in the drawings, the figures of which show as follows:

DETAILED DISCUSSION

Figure 1:
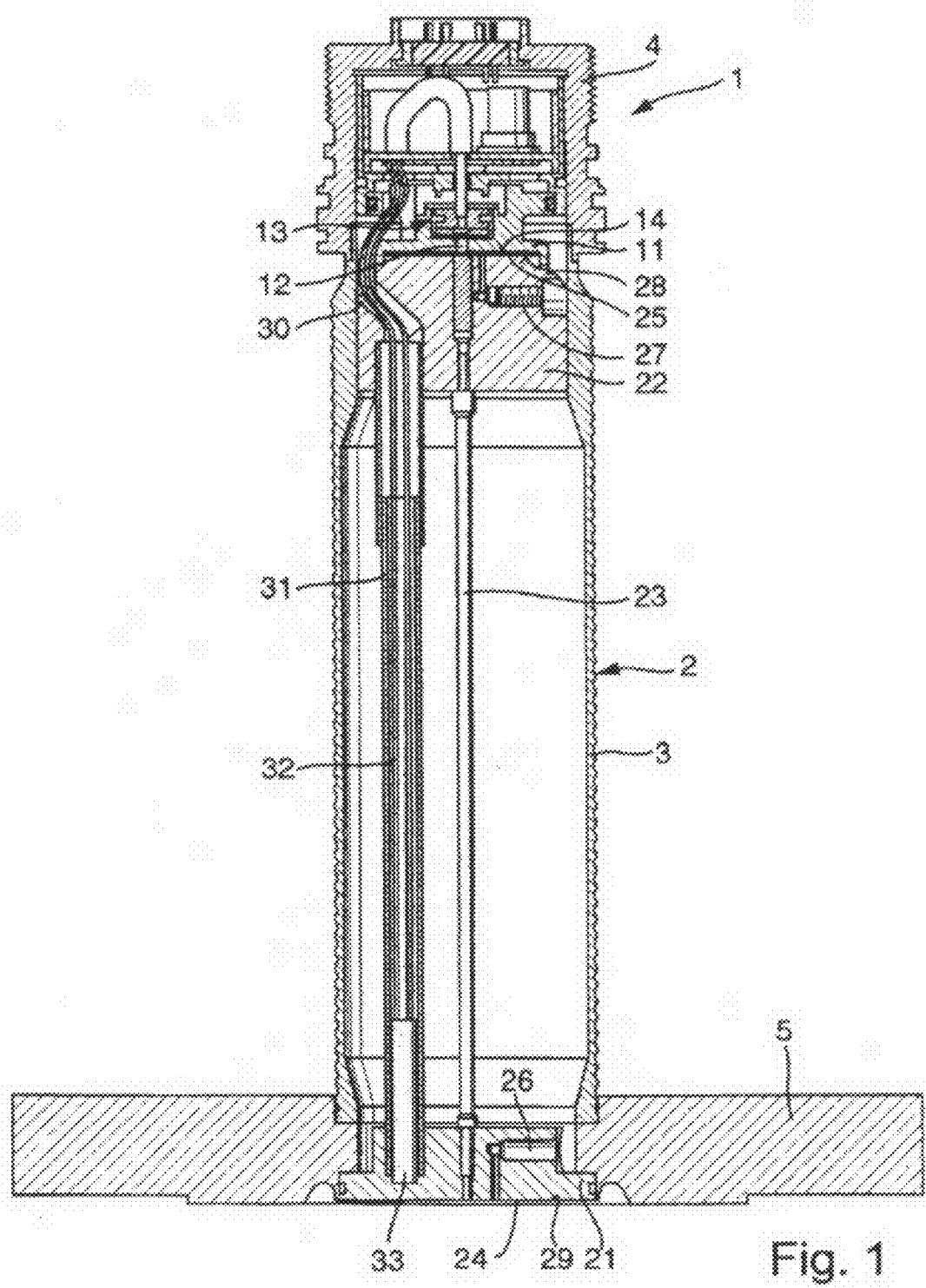
FIG. 1 a longitudinal section through a pressure transducer of the invention.
Figure 2:
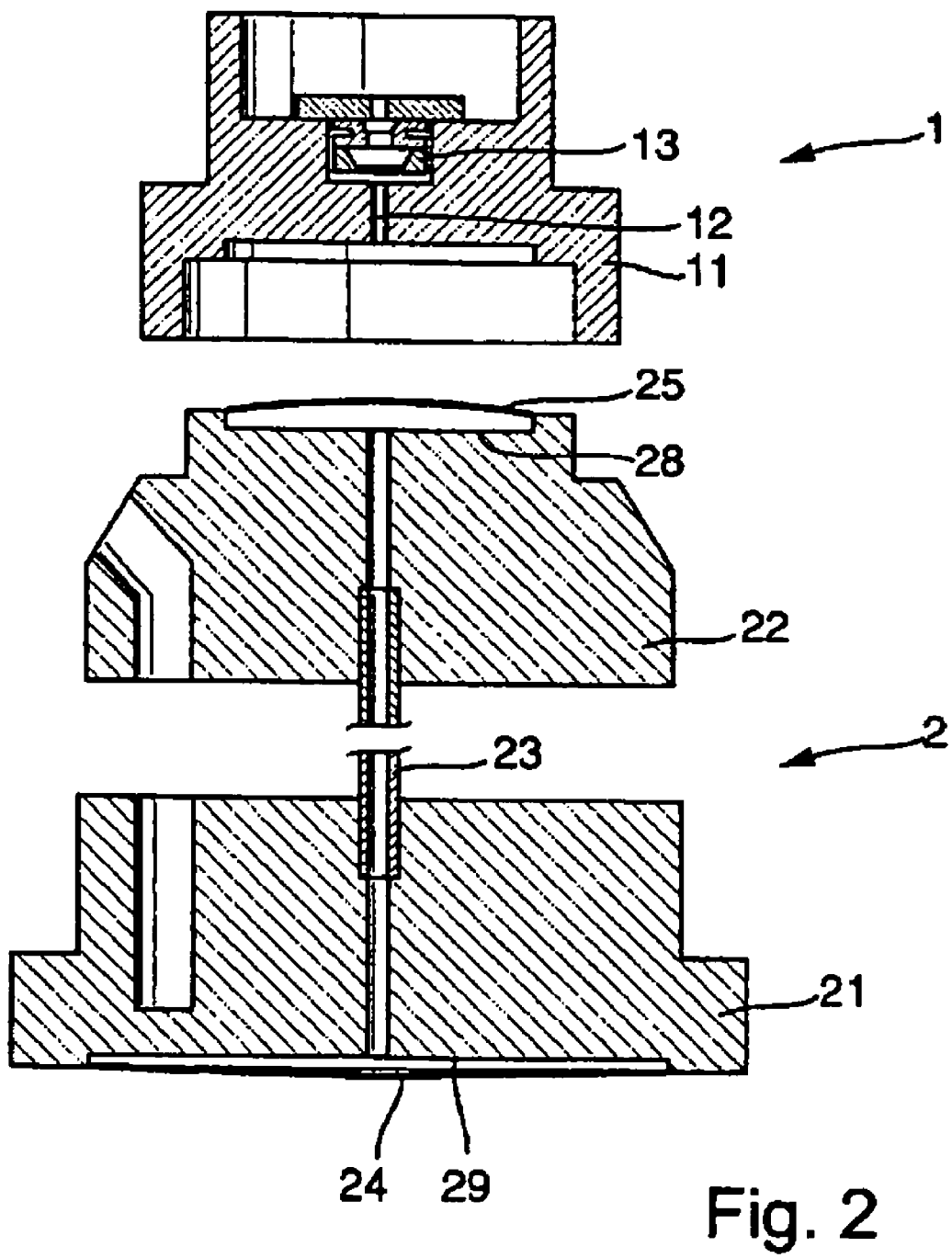
FIG. 2 a longitudinal section through components of a sensor module and a transmission module of the pressure transducer of the invention, with these components being not yet assembled, i.e. presented in exploded view.

As shown in FIGS. 1 and 2, a pressure transducer of the invention includes a sensor module 1 and a transmission module 2. The sensor module 1 includes a sensor body 11, which has, at least sectionally, cylindrical symmetry, or some other axial symmetry. Within the sensor body 11 is located a measuring cell chamber 13, which is connected with a first end surface of the sensor body 11 via a measuring cell canal 12. The first end surface faces toward the transmission module 2. It is additionally bounded by a ring-shaped assembly skirt 17, which protrudes in the axial direction from the first end surface. Assembly skirt 17 has a first assembly end surface 18, which is planar in a currently preferred embodiment. The first assembly end surface 18 is pressure-tightly connected with a fitting, second assembly surface. Details in this regard are explained below in connection with a description of the structure of the transmission module.

The transmission module includes, in a currently preferred embodiment, a process body 21 and a transmission body 22, each of which has, at least sectionally, cylindrical, or rotational, symmetry. The mentioned symmetries are not essential to the invention; they come about, however, when the components are manufactured as turned parts.

Process body 21 and transmission body 22 have, in each case, a traversing, axial bore extending between their end surfaces. Running between the mutually facing, end surfaces of the process body and the transmission body is a capillary line 23, which is pressure tightly connected to each of said traversing bores.

A flexible process diaphragm 24 is secured along its periphery pressure-tightly to the process-side, end surface of the process body 21, the surface far from the capillary line 23. Between process diaphragm 24 and the process body 21, a process pressure chamber 29 is formed, which is in communication with the capillary line 23.

A flexible transmission diaphragm 25 is secured along its periphery pressure-tightly to the end surface of the transmission body 22 far from the capillary line 23. Between transmission diaphragm 25 and the transmission body 22, there is formed, in this way, a transmission pressure chamber 28, which is in communication with the capillary line 23 and thus also with the process pressure chamber 29.

Process pressure chamber 29, the capillary 23 and the transmission pressure chamber 28 are filled with a temperature-resistant transmission-liquid.

During operation of the pressure transducer of the invention, process diaphragm 24 can be exposed to a process medium, and the pressure of the medium is transmitted by means of the transmission liquid to the transmission diaphragm 25.

The sensor-side, end surface of the transmission body exhibits the aforementioned, second assembly surface, with which the first assembly surface of the sensor module is pressure-tightly welded.

The measuring cell chamber as well as the volume between such and the transmission membrane, thus the first hydraulic path, are charged with a transmission liquid, after the sensor body is connected with the transmission body along the first and second assembly surfaces.

In the sensor module and in the transmission module, filling canals are provided for the charging of the first and second hydraulic paths with their respective transmission liquids. Details concerning construction of the filling canals and their sealing are within the skill of the art and require no further presentation.

Additionally provided in the process body 21 is a blind hole, in which a temperature sensor 33 can be positioned, in order to measure a temperature of the process body for providing information concerning the temperature in the second hydraulic path. The connection lines 32 of the temperature sensor 33 are led, through the bore 30 in the edge area of the transmission body, to the sensor module, i.e. to a circuit, which evaluates the temperature data. The connection lines can be guided in a steel tube 31, respectively steel casing, as shown in FIG. 1. The steel tube is preferably inserted into the blind hole in the process body in such a manner that the annular gap between process body and steel tube meets the requirements of a flame arrester.

The invention claimed is:

1. A pressure transducer, comprising:
   a sensor module having a sensor body, which includes a measuring cell chamber, in which a pressure measuring cell is arranged, said pressure measuring cell is loadable with a pressure via a first hydraulic path filled with a transmission liquid said first hydraulic path extruding from said measuring cell chamber through said sensor body to a surface of said sensor body; and
   a transmission module for transmitting a pressure to said first hydraulic path, wherein:
   said transmission module has a second hydraulic path filled with a transmission liquid and extending from a process diaphragm through a transmission body to a transmission diaphragm;
   said transmission diaphragm has a first surface facing said second hydraulic path and a second surface facing away from said second hydraulic path; and
   said sensor body is connected pressure-tightly with said transmission body so that the second surface of said transmission diaphragm faces said surface of said sensor body to which the first hydraulic path extends, whereby said first hydraulic path communicates with said transmission diaphragm, so that the pressure of said second hydraulic path is transmittable through said transmission diaphragm to said first hydraulic path.

2. The pressure transducer as claimed in claim 1, wherein:
   said transmission diaphragm is secured on an end surface of said transmission body to form a transmission pressure chamber.

3. The pressure transducer as claimed in claim 1, wherein:
   said process diaphragm is secured to a surface of a body to form a process pressure chamber; and
   said second hydraulic path extends between said process pressure chamber and said transmission pressure chamber.

4. The pressure transducer as claimed in claim 3, wherein:
said process pressure chamber is formed in the end surface of a process body, said process body being spaced from said transmission body; and
said second hydraulic path includes a pressure line, which extends between said process body and said transmission body.

5. The pressure transducer as claimed in claim 4, wherein:
said pressure line comprises a capillary line.

6. The pressure transducer as claimed in claim 1, wherein:
the surfaces bounding said second hydraulic path comprise a material or materials, which is/are inert with respect to the transmission liquid in said second hydraulic path.

7. The pressure transducer as claimed in claim 6, wherein:
the inert materials comprise corrosion resistant alloys, especially stainless steels.

8. The pressure transducer as claimed in claim 1, wherein;
the surfaces bounding said second hydraulic path comprise molybdenum-containing stainless steels, which, except for possibly present impurities, have no titanium.

9. The pressure transducer as claimed in claim 1, wherein:
said second hydraulic path is charged with the transmission liquid under vacuum at a fill temperature lying not more than 50 Kelvin, preferably not more than 20 Kelvin, further preferably not at all, below the specified maximum temperature of the process medium for operation of the pressure transducer.

10. The pressure transducer as claimed in claim 1, wherein:
said transmission module includes a temperature sensor arranged neighboring said process diaphragm, in order to measure a temperature value providing information concerning temperature of the transmission liquid neighboring said process diaphragm.

11. The pressure transducer as claimed in claim 1, wherein:
said sensor body is connected pressure tightly with said transmission body; and
said first hydraulic path comprises a volume enclosed between said sensor body, said transmission diaphragm and said transmission body.

12. The pressure transducer as claimed in claim 11, wherein:
said sensor body is welded pressure tightly with said transmission body.

13. The pressure transducer as claimed in claim 11, wherein:
charging of the first hydraulic path with a transmission liquid occurs after the connecting of said sensor body with said transmission body.

* * * * *